(12) United States Patent
Torikai (10) Patent No.: US 10,194,070 B2
(45) Date of Patent: Jan. 29, 2019

(54) COMMUNICATION APPARATUS COMMUNICATING WITH EXTERNAL APPARATUS THROUGH WIRELESS COMMUNICATION, CONTROL METHOD OF COMMUNICATION APPARATUS, AND STORAGE MEDIUM

(71) Applicant: CANON KABUSHIKI KAISHA, Tokyo (JP)

(72) Inventor: Hiroyuki Torikai, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/688,168

(22) Filed: Aug. 28, 2017

(65) Prior Publication Data

US 2018/0063407 A1    Mar. 1, 2018

(30) Foreign Application Priority Data

Aug. 30, 2016  (JP) ................................. 2016-168608

(51) Int. Cl.

| | |
|---|---|
| *H04N 5/232* | (2006.01) |
| *G06F 21/74* | (2013.01) |
| *G06F 21/60* | (2013.01) |
| *H04W 4/70* | (2018.01) |
| *H04W 4/80* | (2018.01) |

(52) U.S. Cl.
CPC ....... *H04N 5/23206* (2013.01); *G06F 21/608* (2013.01); *G06F 21/74* (2013.01); *H04N 5/23245* (2013.01); *H04W 4/70* (2018.02); *H04W 4/80* (2018.02)

(58) Field of Classification Search
None
See application file for complete search history.

(56) References Cited

U.S. PATENT DOCUMENTS 9,100,588 B1 * 8/2015 Seymour .............. H04N 5/2621
2014/0028817 A1 * 1/2014 Brockway, III .... H04N 5/23206
348/61

FOREIGN PATENT DOCUMENTS

| JP | 2012-085353 A | 4/2012 |
| JP | 2014-027352 A | 2/2014 |
| JP | 2014-143545 A | 8/2014 |
| JP | 2015-088789 A | 5/2015 |
| JP | 2016-136689 A | 7/2016 |

* cited by examiner

*Primary Examiner* — James M Hannett
(74) *Attorney, Agent, or Firm* — Canon U.S.A., Inc. IP Division (57) ABSTRACT

A communication apparatus includes a first wireless communication unit, a second wireless communication unit, a control unit that remotely controls an imaging apparatus in a mode selected from among a plurality of modes including a first mode for remotely controlling the imaging apparatus via the first wireless communication unit and a second mode for remotely controlling the imaging apparatus via the second wireless communication unit, a display unit, wherein the control unit controls the display unit to display an item for inputting an instruction to cause the imaging apparatus to capture an image, wherein, in the first mode, the control unit controls the display unit to display the item in a first size, and wherein, in the second mode, the control unit controls the display unit to display the item in a second size that is larger than the first size.

28 Claims, 7 Drawing Sheets

FIG.4A
TOP MENU

FIG.4B
Wi-Fi REMOTE STILL
IMAGE-CAPTURING

FIG.4C
Wi-Fi REMOTE MOVING
IMAGE-CAPTURING

COMMUNICATION APPARATUS COMMUNICATING WITH EXTERNAL APPARATUS THROUGH WIRELESS COMMUNICATION, CONTROL METHOD OF COMMUNICATION APPARATUS, AND STORAGE MEDIUM

BACKGROUND

Field

The present disclosure relates to a communication apparatus configured to communicates with an external apparatus through wireless communication.

Description of the Related Art

In recent years, a type of digital camera including a plurality of wireless communication functions that wirelessly connects to a mobile phone has been known. For example, Japanese Patent Application Laid-Open No. 2015-088789 discusses a digital camera including a wireless local area network (LAN) function and a Bluetooth® function to wirelessly connect to a mobile phone.

Japanese Patent Application Laid-Open No. 2016-136689 discusses a technique of remotely capturing an image by using a mobile phone including a touch panel.

There is also provided a type of wireless communication function that does not have a communication speed sufficient for transmitting image data. In a case where an image is remotely captured through such a wireless communication function, it is conceivable that a live view image is not transmitted to the mobile phone. In this case, a user has to wait for a time of releasing a shutter while looking at a screen of the digital camera because it is not possible to capture an image while looking at a live view image on a screen of the mobile phone. At that time, in order to actually instruct the digital camera to release a shutter, the user has to touch a shutter instruction button displayed on the screen of the mobile phone without looking at the screen of the mobile phone. Therefore, there is a possibility that the user can miss the imaging opportunity because a touched position deviated from a display position of the shutter instruction button. The user has to previously position the finger to a display position of the shutter instruction button.

SUMMARY

According to an aspect of the present disclosure, a communication apparatus includes a first wireless communication unit, a second communication unit with a communication speed slower than a communication speed of the first wireless communication unit, a control unit configured to remotely control an imaging apparatus in a mode selected from among a plurality of modes including a first mode for remotely controlling the imaging apparatus via the first wireless communication unit and a second mode for remotely controlling the imaging apparatus via the second wireless communication unit, a display unit, and a detection unit configured to detect a touch operation performed on the display unit, wherein the control unit controls the display unit to display an item for inputting an instruction to cause the imaging apparatus to capture an image, wherein the control unit controls the communication apparatus to transmit an image-capturing request to the imaging apparatus in a case where a touch operation on a predetermined region corresponding to the item for inputting an instruction to cause the imaging apparatus to capture an image is detected by the detection unit, wherein, in the first mode, the control unit controls the display unit to display the item for inputting an instruction to cause the imaging apparatus to capture an image in a first size, and wherein, in the second mode, the control unit controls the display unit to display the item for inputting an instruction to cause the imaging apparatus to capture an image in a second size that is larger than the first size.

Further features will become apparent from the following description of exemplary embodiments with reference to the attached drawings.

BRIEF DESCRIPTION OF THE DRAWINGS

FIG. 5 (consisting of FIGS. 5A and 5B) is a flowchart illustrating processing of the mobile phone according to the first exemplary embodiment.

DESCRIPTION OF THE EMBODIMENTS

Hereinafter, exemplary embodiments will be described in detail with reference to the appended drawings.

The exemplary embodiments described below are merely examples and can be modified or changed as appropriate according to a configuration or various conditions of an apparatus to which the present disclosure is applied. Each of the exemplary embodiments can be combined as appropriate.

<Configuration of Digital Camera>

Figure 1A:
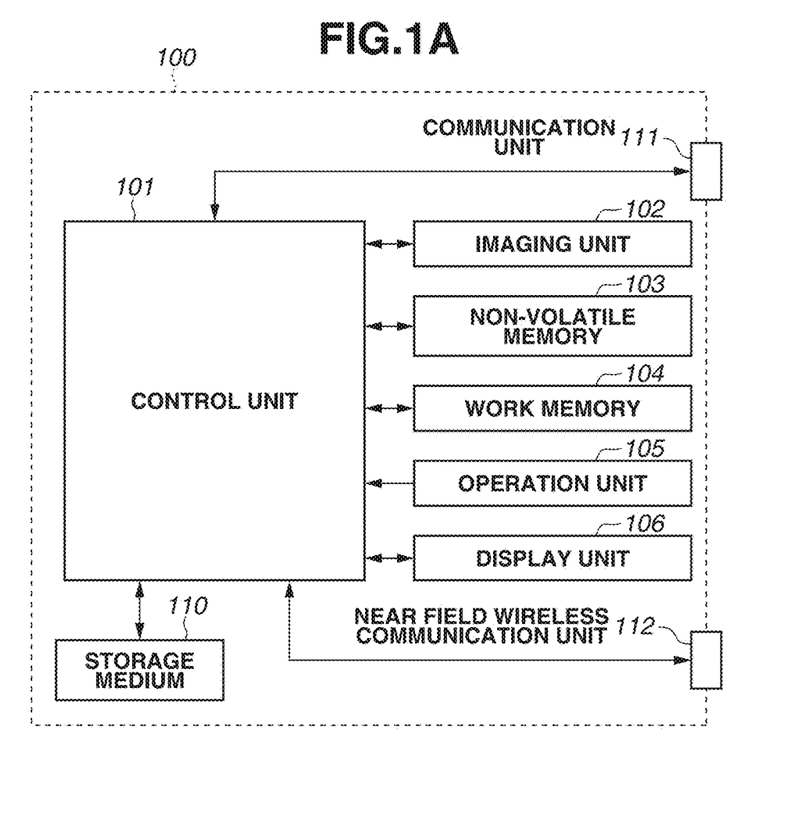
FIG. 1A is a block diagram of a digital camera.

FIG. 1A is a block diagram illustrating a configuration example of a digital camera 100 as an example of the communication apparatus according to a first exemplary embodiment. While a digital camera will be described as an example of the communication apparatus, the communication apparatus is not limited thereto. For example, the communication apparatus can be an information processing apparatus such as a mobile type media player, a tablet device, or a personal computer.

A control unit 101 controls each unit of the digital camera 100 according to an input signal or a program described below. However, a plurality of hardware components can share the processing and control the entire digital camera 100 instead of the control unit 101 controlling the entire digital camera 100.

An imaging unit 102 includes an optical lens unit, a control system for controlling an aperture, a zoom, and a focus, and an image sensor for converting light (video image) introduced via the optical lens unit into an electrical video image signal. Generally, a complementary metal oxide semiconductor (CMOS) image sensor or a charge coupled device (CCD) image sensor is used as the image sensor. Based on control of the control unit 101, the imaging unit 102 converts object light formed into an image through a lens included in the imaging unit 102 into an electric signal through the image sensor, executes noise reduction processing thereon, and outputs digital data as image data. The digital camera 100 according to the present exemplary embodiment stores image data in a storage medium 110 according to a standard of the Design Rule for Camera File (DCF) system.

A non-volatile memory 103 is an electrically recordable/erasable non-volatile memory, and a below-described program executed by the control unit 101 is stored therein.

A work memory 104 is used as a buffer memory for temporarily storing image data captured by the imaging unit 102, an image display memory of a display unit 106, and/or a work area of the control unit 101.

An operation unit 105 is used for receiving an instruction to the digital camera 100 from a user. The operation unit 105 includes a power button for providing a power ON/OFF instruction of the digital camera 100, a release switch for providing an image-capturing instruction, and a playback button for providing a reproduction instruction of image data. The operation unit 105 also includes an operation member such as a connection button dedicated for starting communication with an external device via a communication unit 111 described below. A touch panel formed on the display unit 106 described below is also included in the operation unit 105. In addition, the release switch includes switches SW1 and SW2. The switch SW1 is ON when the release switch is brought into a so-called half-pressed state. In this state, the digital camera 100 accepts instructions for executing image-capturing preparations such as auto-focus (AF) processing, auto-exposure (AE) processing, auto-white balance (AWB) processing, and pre-flash (EF) processing. The switch SW2 is ON when the release switch is brought into a so-called full-pressed state. In this state, the digital camera 100 accepts an instruction for executing image-capturing processing.

The display unit 106 executes display of a live view image sequentially captured and acquired by the imaging unit 102 through image-capturing, display of captured image data, and display of characters used for an interactive operation. The display unit 106 does not have to be integrated with the digital camera 100. The digital camera 100 only needs to include at least a display control function for connecting to an integrated or an external display unit 106 and controlling display of the display unit 106.

The storage medium 110 can store image data output from the imaging unit 102. The storage medium 110 can be detachably attached to the digital camera 100 or can be integrated with in the digital camera 100. In other words, the digital camera 100 only needs to include at least a unit for accessing the storage medium 110.

The communication unit 111 serves as an interface for connecting the digital camera 100 to an external apparatus. The digital camera 100 of the present exemplary embodiment can exchange data with an external apparatus via the communication unit 111. For example, image data generated by the imaging unit 102 can be transmitted to the external apparatus via the communication unit 111. Image-capturing executed by the imaging unit 102 can be controlled by the external apparatus via the communication unit 111. In the present exemplary embodiment, the communication unit 111 includes an interface for communicating with the external apparatus through a wireless local area network (LAN) compliant with standards of the Institute of Electrical and Electronics Engineers (IEEE) 802.11. The control unit 101 controls the communication unit 111 to realize wireless communication with the external apparatus.

A near field wireless communication unit 112 includes an antenna used for wireless communication, a modulation/demodulation circuit for processing a wireless signal, and a communication controller. The near field wireless communication unit 112 outputs a modulated wireless signal from the antenna and demodulates a wireless signal received by the antenna to realize near field wireless communication compliant with the IEEE 802.15 standard (i.e., Bluetooth®). In the present exemplary embodiment, low-power consumption Bluetooth Low Energy version 4.0 is employed as the Bluetooth communication. The Bluetooth Low Energy communication includes a communicable range narrower than that of the wireless LAN communication (i.e., a communicable distance thereof is shorter). A communication speed of the Bluetooth Low Energy communication is slower than that of the wireless LAN communication. Power consumption of the Bluetooth Low Energy communication is lower than that of the wireless LAN communication. The digital camera 100 of the present exemplary embodiment can exchange data with an external apparatus via the near field wireless communication unit 112. For example, image-capturing executed by the imaging unit 102 can be controlled by the external apparatus via the communication unit 111. However, image data generated by the imaging unit 102 is not transmitted therewith because the communication speed is slow.

The communication unit 111 of the digital camera 100 in the present exemplary embodiment can operate in an access point (AP) mode for operating as an access point in an infrastructure mode and a client (CL) mode for operating as a client in the infrastructure mode. By causing the communication unit 111 to operate in the CL mode, the digital camera 100 in the present exemplary embodiment can operate as a CL device in the infrastructure mode. When the digital camera 100 operates as a CL device, the digital camera 100 can participate in a network formed by an AP device by connecting to the AP device. By causing the communication unit 111 to operate in the AP mode, the digital camera 100 in the present exemplary embodiment can operate as a simplified AP, i.e., a type of an AP having a limited function. When the digital camera 100 operates as a simplified AP, the digital camera 100 forms a network by itself. A device in the vicinity of the digital camera 100 recognizes the digital camera 100 as an AP device in order to participate in the network formed by the digital camera 100. A program that operates the digital camera 100 as described above is stored in the non-volatile memory 103.

The digital camera 100 in the present exemplary embodiment serves as a type of the AP called a simplified AP that does not have a gateway function for transferring data received from the CL device to an internet provider. Accordingly, even if the digital camera 100 receives data from another apparatus participating in the network formed by the digital camera 100, the data cannot be transferred to a network such as the Internet.

Figure 1B:
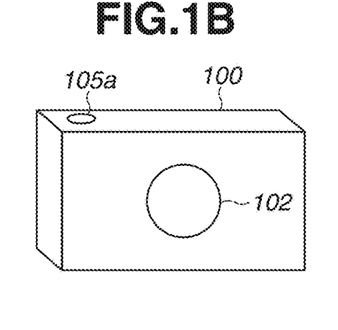
FIGS. 1B and 1C are diagrams illustrating an external view of the digital camera according to the first exemplary embodiment.
Figure 1C:
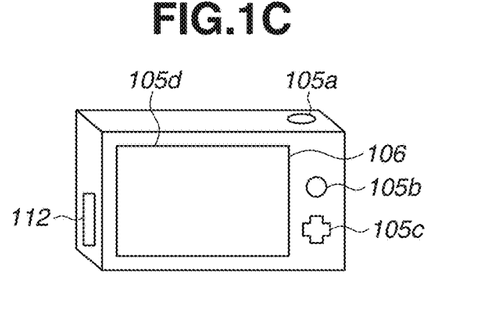

Next, an external view of the digital camera 100 will be described. FIGS. 1B and 1C are diagrams illustrating an example of the external view of the digital camera 100. A release switch 105a, a playback button 105b, a direction key 105c, and a touch panel 105d are operation members included in the above-described operation unit 105. An image acquired by the imaging unit 102 through image-capturing is displayed on the display unit 106.

The digital camera 100 in the present exemplary embodiment includes an antenna portion of the near field wireless communication unit 112 provided on a side face of the camera housing. When the near field wireless communication unit 112 approaches a near field wireless communication unit of another device, near field wireless communication can be established with the other device. Through this operation, the digital camera 100 can execute contactless communication without the use of a cable while restricting a communication partner according to user's intention.

<Internal Configuration of Mobile Phone 200>

Figure 2A:
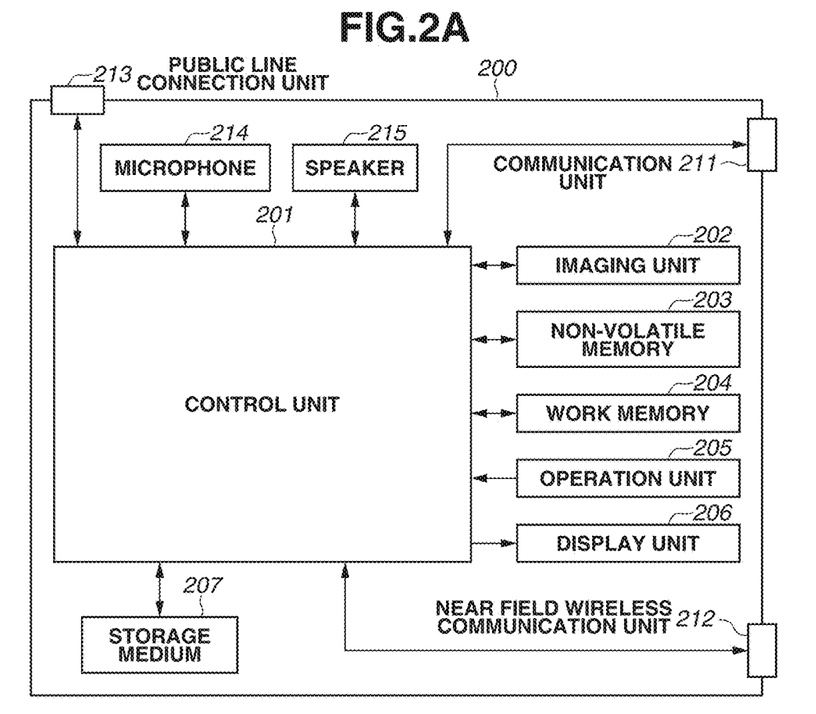
FIGS. 2A and 2B respectively are a block diagram illustrating a configuration of a mobile phone and an example appearance of the mobile phone according to the first exemplary embodiment.

FIG. 2A is a block diagram illustrating a configuration example of the mobile phone 200 as an example of an information processing apparatus according to the present exemplary embodiment. While a mobile phone will be described as an example of the information processing apparatus, the information processing apparatus is not limited thereto. For example, the information processing apparatus can be a digital camera, a tablet device, or a personal computer with a wireless function.

A control unit 201 controls each unit of the mobile phone 200 according to an input signal or a program described below. In addition, a plurality of hardware components can share the processing and control the entire mobile phone 200 instead of the control unit 201 controlling the entire mobile phone 200.

An imaging unit 202 converts object light formed into an image through a lens included in the imaging unit 202 into an electric signal, executes noise reduction processing thereon, and outputs digital data as image data. After the captured image data is stored in a buffer memory, the control unit 201 executes predetermined calculation and stores the resultant image data in a storage medium 210.

A non-volatile memory 203 is an electrically recordable/erasable non-volatile memory. An operating system (OS) as basic software executed by the control unit 201 and an application cooperating with the OS to realize an applicative function are stored in the non-volatile memory 203. In the present exemplary embodiment, a camera application (hereinafter, referred to as "application") for communicating with the digital camera 100 and remotely controlling the digital camera 100 is stored in the non-volatile memory 203.

A work memory 204 is used as an image display memory of a display unit 206 and/or a work area of the control unit 201.

An operation unit 205 is used for receiving an instruction to the mobile phone 200 from a user. The operation unit 205 includes operation members such as a power button for enabling a user to input a power ON/OFF instruction and a touch panel formed on the display unit 206.

The display unit 206 executes display of image data and display of characters used for an interactive operation. The display unit 206 does not need to be integrated with the mobile phone 200. The mobile phone 200 only needs to include at least a display control function for connecting to the display unit 206 and controlling the display of the display unit 206.

The mobile phone 200 according to the present exemplary embodiment includes a touch panel that detects a touch onto the display unit 206 as an operation member of the operation unit 205, and the touch panel and the display unit 206 are integrally configured. For example, the touch panel is configured so that the light transmittance does not interfere with display of the display unit 206, and is attached on an upper layer of a display face of the display unit 206. Input coordinates of the touch panel are associated with display coordinates on the display unit 206. In this way, a graphical user interface (GUI) is provided that the user can use as if the user directly operates a screen displayed on the display unit 206. A touch panel of various types, i.e., a resistive film type, an electrostatic capacitance type, a surface elastic wave type, an infrared type, an electromagnetic induction type, an image recognition type, and an optical sensor type can be used as the touch panel.

The control unit 201 can detect the following operations onto the touch panel:
1. The touch panel is touched with a finger or a stylus pen (hereinafter, referred to as "Touch-Down").
2. The touch panel is being touched with a finger or a stylus pen (hereinafter, referred to as "Touch-On").
3. A finger or a stylus pen is moved while touching the touch panel (hereinafter, referred to as "Move").
4. A finger or a stylus pen that has touched the touch panel is removed (hereinafter, referred to as "Touch-Up").
5. Neither a finger nor a stylus pen touches the touch panel (hereinafter, referred to as "Touch-Off").

These operations and information about position coordinates at which the finger or the stylus pen touches the touch panel are notified to the control unit 201, and the control unit 201 determines what operation has been executed on the touch panel based on the notified information. A moving direction of the finger or the stylus pen moving on the touch panel in Move can also be determined at each of vertical and horizontal components of the touch panel based on the change of position coordinates. When the user performs Touch-Up from Touch-Down after performing a certain period or amount of Move on the touch panel, it is assumed that a stroke is drawn thereon. Hereinafter, an operation of quickly drawing a stroke is called "Flick". Flick is an operation where the user quickly moves the user's finger or stylus pen over a certain distance while touching the touch panel and removing the user's finger or stylus pen therefrom. In other words, Flick is an operation of quickly moving the user's finger or stylus pen on the touch panel like flicking the touch panel. When Move of a predetermined distance or more at a predetermined speed or higher is detected and Touch-Up is detected thereafter, the control unit 201 determines that Flick is performed. When Move of a predetermined distance or longer at slower than a predetermined speed is detected, the control unit 201 determines that "Drag" is performed.

The storage medium 210 can store image data output from the imaging unit 202. The storage medium 210 can be detachably attached to the mobile phone 200 or can be integrated with the mobile phone 200. In other words, the mobile phone 200 only needs to include at least a unit for accessing the storage medium 210.

The communication unit 211 serves as an interface for connecting the mobile phone 200 to an external apparatus. The mobile phone 200 of the present exemplary embodiment can exchange data with the digital camera 100 via the communication unit 211. In the present exemplary embodiment, the communication unit 211 serves as an antenna, and the control unit 201 can connect to the digital camera 100 via the antenna. The mobile phone 200 can directly connect to the digital camera 100 or can connect thereto via an access point. For example, a picture transfer protocol over internet protocol (PTP/IP) through the wireless LAN can be used as a protocol for communicating data. In addition, a method of communicating with the digital camera 100 is not limited thereto. For example, the communication unit 211 can include a wireless communication module such as an infrared communication module, a Bluetooth communication module, or a wireless universal serial bus (USB).

A near field wireless communication unit 212 includes an antenna used for wireless communication, a modulation/demodulation circuit for processing a wireless signal, and a communication controller. The near field wireless communication unit 212 outputs a modulated wireless signal from the antenna and demodulates a wireless signal received by the antenna to realize near field wireless communication compliant with the IEEE 802.15 standard (i.e., Bluetooth). In the present exemplary embodiment, similar to the above-described configuration of the digital camera 100, Bluetooth Low Energy version 4.0 is employed as the Bluetooth communication.

In order to execute near field wireless communication with the digital camera 100 of the present exemplary embodiment, first, the mobile phone 200 has to connect to the near field wireless communication unit 112 of the digital camera 100 through an operation called "pairing" for one-to-one connection in the near field wireless communication. In the pairing operation, for example, the digital camera 100 operates as a Peripheral device in the Bluetooth Low Energy and periodically transmits a signal called "Advertise" to notify peripheral devices about its existence using the near field wireless communication unit 112. Then, the mobile phone 200 operates as a Central device to execute a scanning operation using the near field wireless communication unit 212 to receive the Advertise signal from the digital camera 100 to find the digital camera 100. When the mobile phone 200 finds the digital camera 100, the mobile phone 200 transmits a participation request to establish connection of the near field wireless communication through an Initiate operation.

A public line communication unit 213 is an interface used for executing public wireless communication. The mobile phone 200 can execute telephone calls with other devices via the public line communication unit 213. At that time, the control unit 201 inputs and outputs an audio signal via a microphone 214 and a speaker 215 to realize a telephone call.

In the present exemplary embodiment, the public line communication unit 213 is an antenna, and the control unit 201 can connect to the public line via the antenna. A single antenna can be used for both the communication unit 211 and the public line communication unit 213.

Figure 2B:
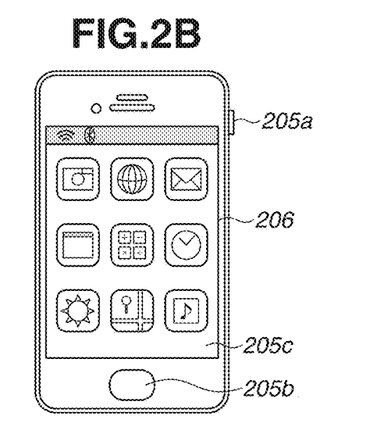

Next, an external view of the mobile phone 200 will be described. FIG. 2B is a diagram illustrating an example of an external view of the mobile phone 200. A power button 205a, a home button 205b, and a touch panel 205c are operation members included in the above-described operation unit 205. When the user presses the home button 205b, an application being executed is stopped, and a home screen from which the user can select another application is displayed on the display unit 206.

<Remote Image-Capturing Function>

Next, a procedure for remotely controlling an image-capturing operation of the digital camera 100 from the mobile phone 200 of the present exemplary embodiment will be described.

Figure 3A:
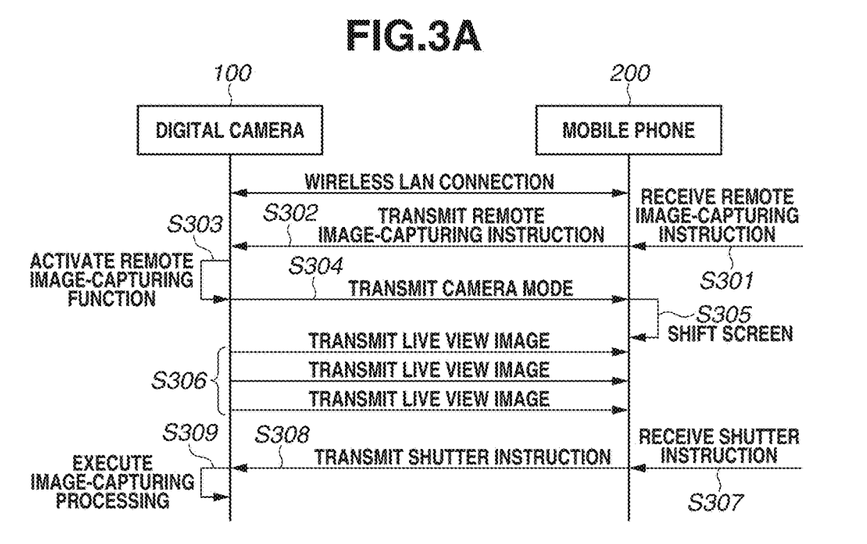
FIGS. 3A and 3B are sequence diagrams illustrating a procedure for remotely controlling the digital camera from the mobile phone via a wireless local area network (LAN) and a procedure for remotely controlling the digital camera from the mobile phone via the Bluetooth Low Energy (BLE) according to the first exemplary embodiment.

FIG. 3A is a sequence diagram illustrating a procedure for remotely controlling an image-capturing operation of the digital camera 100 from the mobile phone 200 via the wireless LAN. The procedure in FIG. 3A is started in a state where the digital camera 100 and the mobile phone 200 are previously connected to each other via the wireless LAN. The mobile phone 200 has activated the application for remotely controlling the digital camera 100.

Figure 4A:
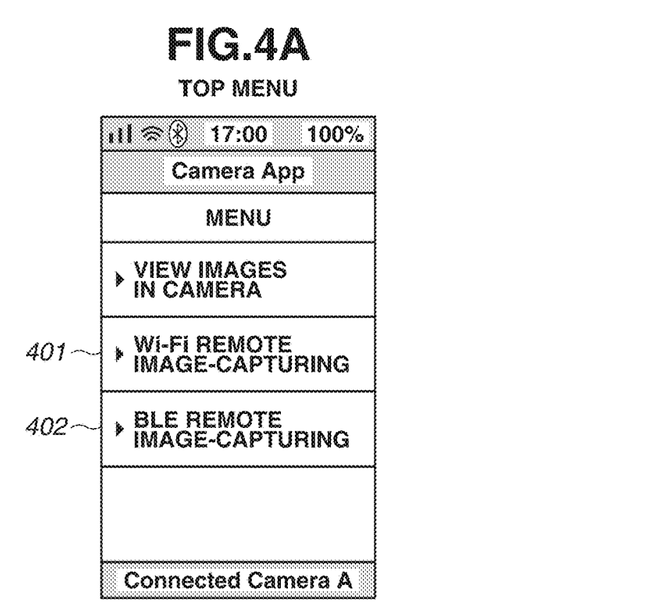
FIGS. 4A to 4E are examples of screens displayed on a display unit of the mobile phone according to the first exemplary embodiment.

First, in step S301, the user executes a selection operation of a service displayed on a top menu of the application to input an instruction for remotely controlling the digital camera 100 via the wireless LAN. Herein, for example, a screen illustrated in FIG. 4A is displayed on the display unit 206 of the mobile phone 200. The user touches a display region of a remote image-capturing button 401 from among software buttons for providing execution instructions of respective services displayed on the screen in FIG. 4A. With this operation, the mobile phone 200 detects that the selection operation of the software button has been executed via the touch panel, which is a part of the operation unit 205.

In response to the input of the above instruction, in step S302, the mobile phone 200 notifies the digital camera 100 of a remote image-capturing request via the wireless LAN.

In response to the request, in step S303, the digital camera 100 activates a remote image-capturing function. In step S304, the digital camera 100 transmits information about an operation mode of the digital camera 100 at the time of receiving the request in step S302 to the mobile phone 200 via the wireless LAN. Herein, if the digital camera 100 is in a still image-capturing mode, information indicating the still image-capturing mode is notified. If the digital camera 100 is in a moving image-capturing mode, information indicating the moving image-capturing mode is notified.

Figure 4B:
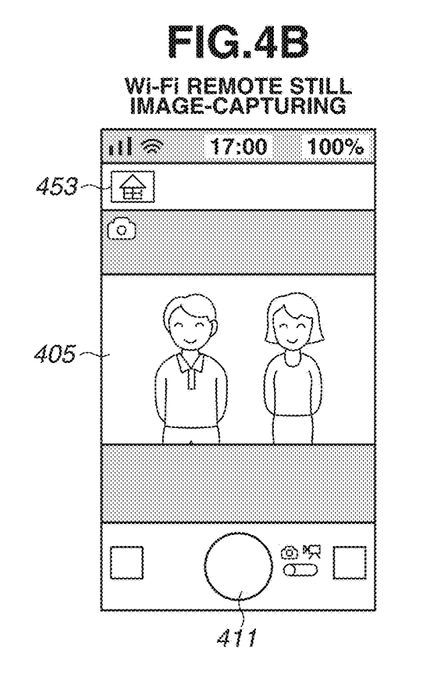
Figure 4C:
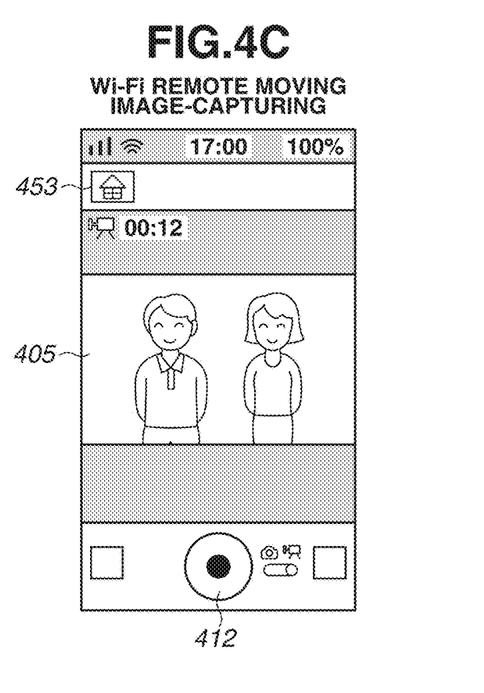

In step S305, the mobile phone 200 notified of the image-capturing mode of the digital camera 100 shifts the screen according to the image-capturing mode. For example, if the mobile phone 200 is notified that the digital camera 100 is in the still image-capturing mode, a screen illustrated in FIG. 4B is displayed. If the mobile phone 200 is notified that the digital camera 100 is in the moving image-capturing mode, a screen illustrated in FIG. 4C is displayed. FIGS. 4B and 4C are diagrams illustrating examples of screens for executing remote image-capturing via Wi-Fi®, and various display items are arranged on the screens. For example, a live view image of the digital camera 100 includes icons for executing various kinds of processing relating to image-capturing and icons for setting various kinds of imaging parameters, such as an ISO and a white balance, are displayed as the display items. In FIG. 4B, a shutter button 411 is displayed as an icon for inputting an instruction for causing the digital camera 100 to execute a still image-capturing operation. In FIG. 4C, a recording start button 412 is displayed as an icon for inputting an instruction for causing the digital camera 100 to execute the moving image recording operation. In addition, the recording start button 412 is a toggle button that is switched to a recording stop button when recording is being executed.

In step S306, the digital camera 100 repeatedly transmits a live view image to the mobile phone 200. The mobile phone 200 repeatedly transmits a request of the live view image to the digital camera 100 depending on a communication protocol of an application layer between the digital camera 100 and the mobile phone 200 to continuously receive the live view image.

The received live view image is sequentially displayed on a live view image display region 405 in FIG. 4B or 4C, so that the user can provide an image-capturing instruction while looking at the screen of the digital camera 100 via the screen of the mobile phone 200.

Thereafter, for example, if the user touches the shutter button 411 in step S307, in step S308, the mobile phone 200 transmits a shutter instruction to the digital camera 100. In response to the shutter instruction, in step S309, the digital camera 100 executes image-capturing processing to capture a still image. If the user touches the recording start button 412 in step S307, a recording start instruction is transmitted in step S308 so that the digital camera 100 starts recording a moving image in step S309.

As described above, when the user remotely controls the image-capturing operation of the digital camera 100 from the mobile phone 200 via the wireless LAN connection, the user can operate the digital camera 100 while looking at the screen of the mobile phone 200.

Next, processing for remotely controlling the image-capturing operation of the digital camera 100 through the mobile phone 200 via the Bluetooth Low Energy will be described.

Figure 3B:
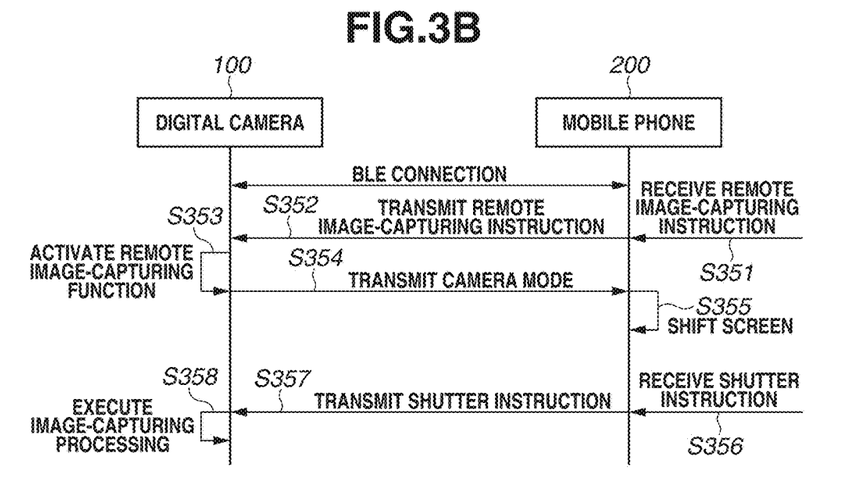

FIG. 3B is a sequence diagram illustrating a procedure for remotely controlling the digital camera 100 from the mobile phone 200 via the Bluetooth Low Energy. The procedure illustrated in FIG. 3B is started in a state where the digital camera 100 and the mobile phone 200 are previously connected to each other via the Bluetooth Low Energy. It is assumed that the mobile phone 200 has activated the application for remotely controlling the digital camera 100.

First, in step S351, the user executes a selection operation of a service displayed on a top menu of the application to input an instruction for remotely controlling the digital camera 100 via the Bluetooth Low Energy. At that time, for example, a screen illustrated in FIG. 4A is displayed on the display unit 206 of the mobile phone 200. The user touches a display region of a Bluetooth Low Energy remote control button 402 from among software buttons for providing execution instructions of respective services displayed on the screen in FIG. 4A. With this operation, the mobile phone 200 detects that the selection operation of the software button has been executed via the touch panel, which is a part of the operation unit 205.

In response to the input of the above instruction, in step S352, the mobile phone 200 notifies the digital camera 100 of a request of the Bluetooth Low Energy remote control function via the Bluetooth Low Energy.

In response to the request, in step S353, the digital camera 100 activates the remote image-capturing function. In step S354, the digital camera 100 transmits information about the operation mode of the digital camera 100 at the time of receiving the request in step S352 to the mobile phone 200 via the Bluetooth Low Energy. At that time, if the digital camera 100 is in a still image-capturing mode, information indicating the still image-capturing mode is notified. If the digital camera 100 is in a moving image-capturing mode, information indicating the moving image-capturing mode is notified.

Figure 4D:
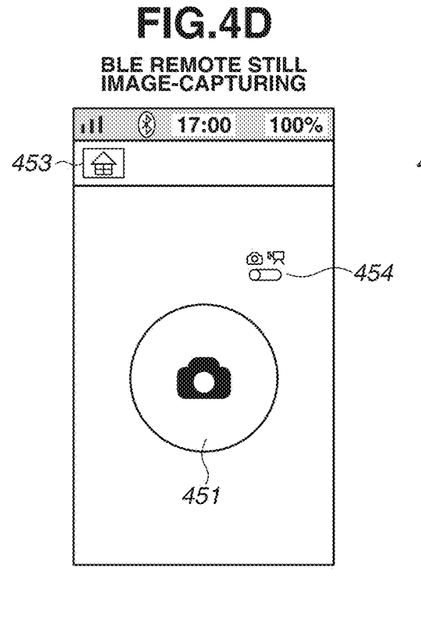
Figure 4E:
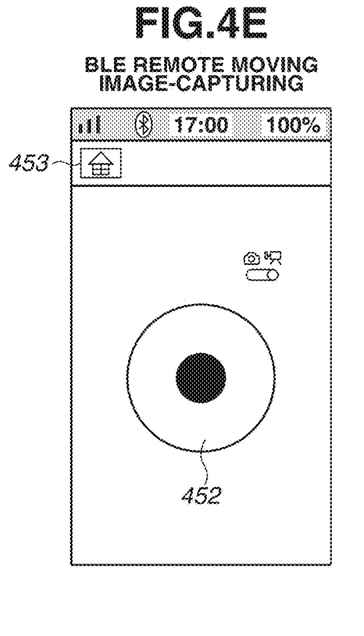

In step S355, the mobile phone 200 that is notified of the image-capturing mode of the digital camera 100 shifts the screen according to the image-capturing mode. For example, if the mobile phone 200 is notified that the digital camera 100 is in the still image-capturing mode, a screen illustrated in FIG. 4D is displayed. If the mobile phone 200 is notified that the digital camera 100 is in the moving image-capturing mode, a screen illustrated in FIG. 4E is displayed. In FIG. 4D, a shutter button 451 for inputting an instruction for causing the digital camera 100 to execute a still image-capturing operation is displayed. In FIG. 4E, a recording start button 452 for inputting an instruction for causing the digital camera 100 to execute a moving image recording operation is displayed. The recording start button 452 is a toggle button that is switched to a recording stop button when recording is being executed.

Different from the screen in FIG. 4B or 4C for remotely controlling the digital camera 100 through the wireless LAN connection, a live view image is not displayed on the screen. This is because data of a size only up to 20 bytes can be sent at one communication in the Bluetooth Low Energy connection, and transmitting a piece of image data with a size of several kilobytes to several megabytes can require a lot of time. Therefore, it is not possible to realize the live view image function. Accordingly, in the remote control executed via the Bluetooth Low Energy, the live view image cannot be displayed. Therefore, it is conceivable that the user executes remote control while looking at the screen of the digital camera 100. At that time, the user has to perform a shutter operation without looking at the screen of the mobile phone 200. When, for example, the user takes a selfie (i.e., picture of oneself) using a selfie stick, the user also has to perform a shutter operation without looking at the screen of the mobile phone 200 because the user has to face the digital camera 100.

Therefore, in the present exemplary embodiment, the shutter button 451 or the recording start button 452 is displayed in a size larger than a size of the shutter button 411 or the recording start button 412 in FIG. 4B or 4C, and a touch reaction region is also increased according to an increase in the button size. With this configuration, even if a certain extent of deviation arises at the user's touched position, a possibility of failing to issue a user's shutter instruction can be reduced.

In FIG. 4D or 4E, considering a situation in which the user performs a touch operation without looking at the screen, a button that reacts on only Touch-Down or Touch-Up is not arranged in the vicinity of the shutter button 451 or the recording start button 452. Because an upper region of the screen where a user's finger does not easily reach is less likely to be erroneously touched by the user, a return button 453 for returning the screen to the top menu is displayed in the upper region.

It is assumed that the image-capturing mode is often switched when the user uses the remote image-capturing function, a mode switch button 454 for switching the mode between the still image-capturing mode and the moving image-capturing mode can be arranged in a region where the user's finger can easily reach. However, it is necessary to avoid a situation in which the user erroneously touches the mode switch button 454 to miss the imaging opportunity when a touch operation to the shutter button 451 or the recording start button 452 is to be executed. Therefore, a display form, such as a slide switch, is used for the mode switch button 454, so that the mode switch button 454 does not react in response to only Touch-Up or Touch-Down, but can react in response to Move of a predetermined distance or longer.

With this configuration, the mode can be shifted based on a direction in which the Move is performed. Because it is possible to determine that the mode switch button 454 is operated when Move is performed, the mode can be switched when Move is performed in a region other than the display region of the mode switch button 454. In the present exemplary embodiment, while priority is given to a configuration enabling the user not to miss the imaging opportunity, the screen in which icons for setting imaging parameters are eliminated has been taken as an example as illustrated in FIG. 4D.

However, the icons for setting the imaging parameters can also be displayed if the screen is wide enough and the shutter button 451 is less likely to be erroneously operated. The same can be also said for the screen in FIG. 4E. Thereafter, in steps S356 to S358, processing similar to the processing in steps S307 to S309 in FIG. 3A is executed through the Bluetooth Low Energy.

As described above, when the image-capturing operation of the digital camera 100 is remotely controlled from the mobile phone 200 via the Bluetooth Low Energy connection, a button for providing a shutter instruction or a recording start instruction is displayed in a larger size. With this configuration, even if the user performs the operation without looking at the screen of the mobile phone 200, a possibility of executing an erroneous operation can be reduced.

For the sake of simplicity, it is assumed that the mobile phone 200 has been connected in advance to the wireless LAN or the Bluetooth Low Energy in FIG. 3A or 3B. However, for example, there can be a case where the mobile phone 200 previously connected to the Bluetooth Low Energy when the processing in FIG. 3A is started. In this case, for example, the remote image-capturing button 401 can be displayed in gray and brought into a non-selectable state.

Alternatively, when the user touches the remote image-capturing button 401, the processing in step S302 and subsequent steps in FIG. 3A can be executed after the connection is automatically switched to the wireless LAN connection. In this case, the digital camera 100 and the mobile phone 200 can share the communication parameters (e.g., a service set identifier (SSID) and a password) necessary for the wireless LAN connection via the Bluetooth Low Energy and establish the wireless LAN connection by using the communication parameters.

There can be a case where the mobile phone 200 has already been connected to the wireless LAN when the processing in FIG. 3B is started. In this case, the Bluetooth Low Energy remote control button 402 can be displayed in gray and brought into a non-selectable state. Alternatively, when the user touches the Bluetooth Low Energy remote control button 402, the processing in step S352 and subsequent steps in FIG. 3B can be executed after the connection is automatically switched to the Bluetooth Low Energy connection. In this case, the digital camera 100 and the mobile phone 200 can share the communication parameters (e.g., a BD_ADDR and a password) necessary for the Bluetooth Low Energy connection via the wireless LAN and establish the Bluetooth Low Energy connection by using the communication parameters.

<Operation of Mobile Phone>

Operation of the mobile phone 200 that realizes the above-described functions will now be described.

Figures 5, 5A:
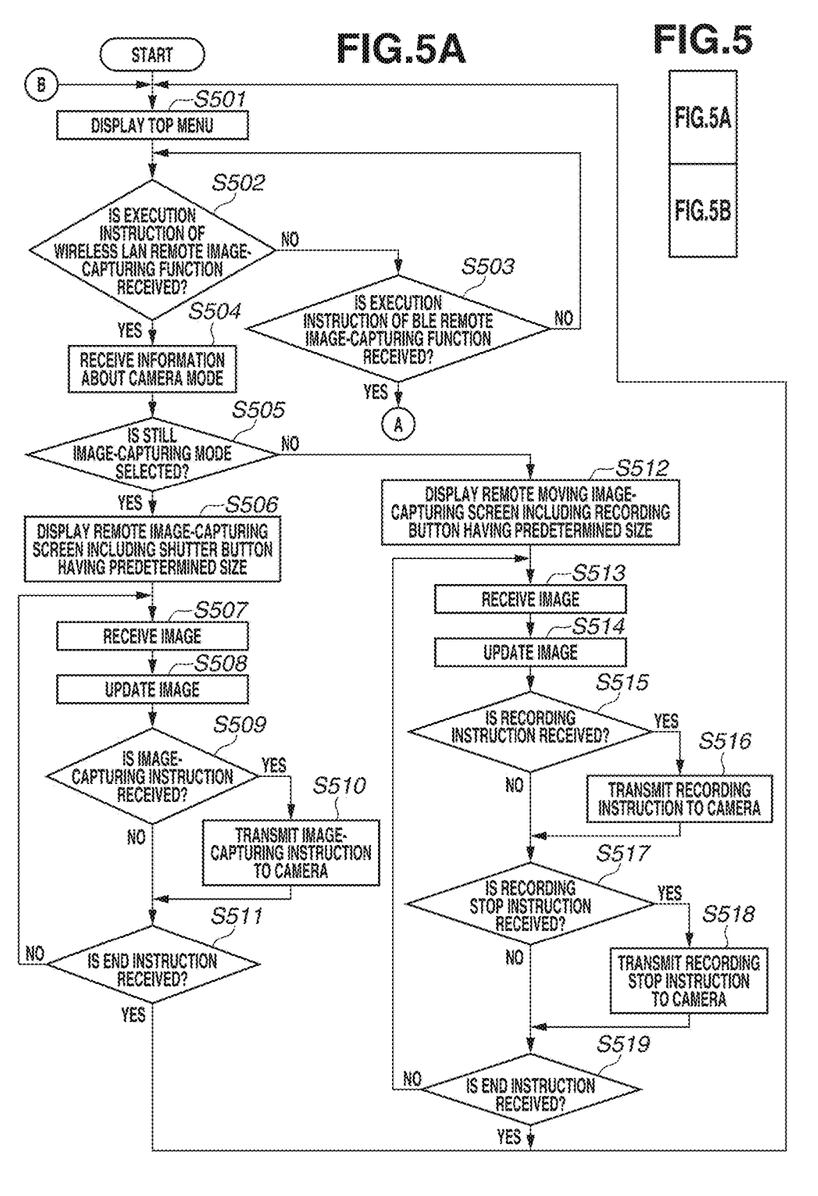
Figure 5B:
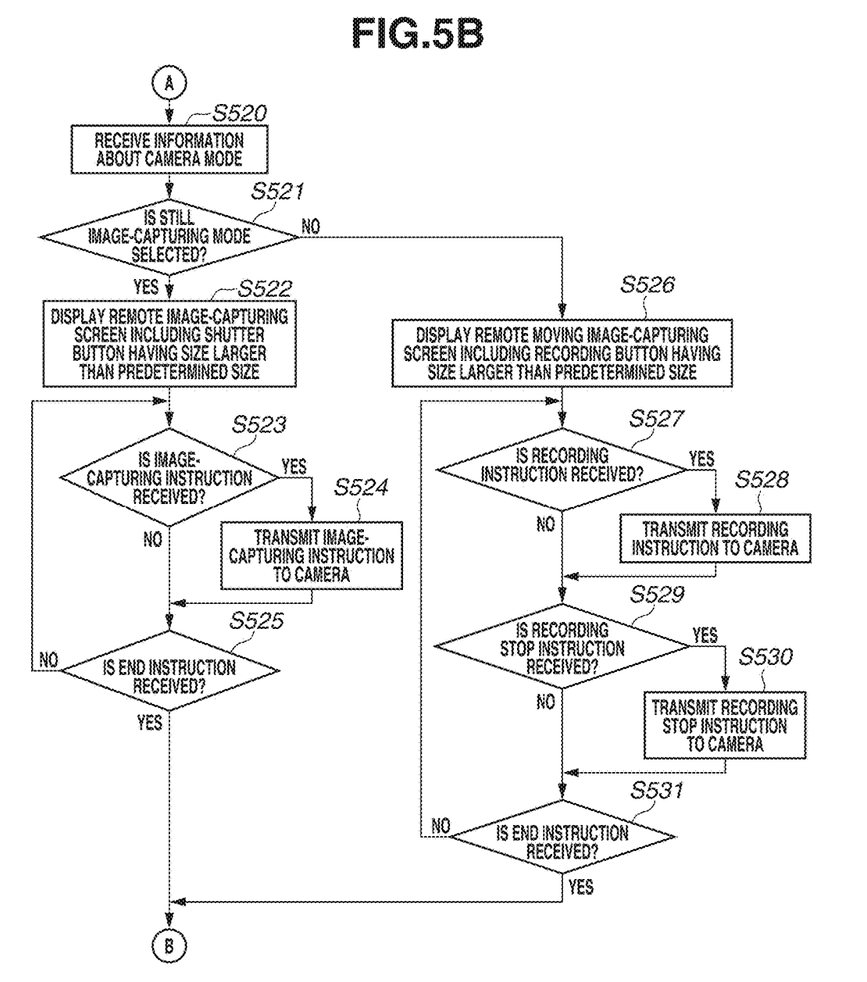

FIG. 5 (consisting of FIGS. 5A and 5B) is a flowchart illustrating the processing of the mobile phone 200 in the present exemplary embodiment. The control unit 201 of the mobile phone 200 controls each unit of the mobile phone 200 according to an input signal, the OS, or the camera application to realize the processing illustrated in the flowchart. The flowchart is started when the mobile phone 200 receives an instruction for executing the camera application.

First, in step S501 in FIG. 5, the control unit 201 controls the display unit 206 to display a top menu of the camera application. For example, a screen illustrated in FIG. 4A is displayed on the display unit 206. Next, in step S502, the control unit 201 determines whether an instruction for executing the wireless LAN remote image-capturing function is received. For example, the user can input an instruction for executing the wireless LAN remote image-capturing function by touching the remote image-capturing button 401 in FIG. 4A. If the control unit 201 determines that the instruction is not received (NO in step S502), the processing proceeds to step S503.

In step S503, the control unit 201 determines whether an instruction for executing the Bluetooth Low Energy remote image-capturing function is received. For example, the user can input an instruction for executing the Bluetooth Low Energy remote image-capturing function by touching the Bluetooth Low Energy remote control button 402 in FIG. 4A. If the control unit 201 determines that the instruction is not received (NO in step S503), the processing returns to step S502, and the control unit 201 waits for a user's instruction. For the sake of simplicity, description of the functions other than the remote image-capturing function and the Bluetooth Low Energy remote control function will be omitted. However, in a case where execution of any of the other functions is instructed, a function according to the instruction will be executed.

Hereinafter, processing of the remote image-capturing function will be described.

Processing that is to be executed when the control unit 201 determines that an instruction for executing the wireless LAN remote image-capturing function is received in step S502 (YES in step S502) will be described. In this case, the processing proceeds to step S504. If the mobile phone 200 is connected to the Bluetooth Low Energy instead of the wireless LAN, the connection can be automatically switched to the wireless LAN connection. If the mobile phone 200 is not connected to the wireless LAN or the Bluetooth Low Energy, the control unit 201 can prompt the user to connect the mobile phone 200 thereto.

In step S504, the control unit 201 receives information about a camera mode from the digital camera 100 via the communication unit 211. Next, in step S505, the control unit 201 refers to the information about the camera mode received in step S504 and determines whether the image-capturing mode of the digital camera 100 is the still image-capturing mode or the moving image-capturing mode.

Processing that is to be executed when the control unit 201 determines that the image-capturing mode of the digital camera 100 is the still image-capturing mode in step S505 (YES in step S505) will be described. In this case, the processing proceeds to step S506. In step S506, the control unit 201 displays a remote image-capturing screen including the shutter button 411 of a predetermined size on the display unit 206. Herein, a screen illustrated in FIG. 4B is displayed. In step S507, the control unit 201 receives a live view image from the digital camera 100 via the communication unit 211.

In step S508, the control unit 201 displays the received live view image on the display unit 206. If the live view image was previously displayed thereon, the control unit 201 updates the displayed live view image. With this processing, the live view image is sequentially displayed on the live view image display region 405 in FIG. 4B.

Next, in step S509, the control unit 201 determines whether an image-capturing instruction is received. For example, when a touch operation is performed on the shutter button 411 in FIG. 4B, the control unit 201 determines that the image-capturing instruction is received. If the image-capturing instruction is received (YES in step S509), the processing proceeds to step S510.

In step S510, the control unit 201 transmits the image-capturing instruction to the digital camera 100 via the communication unit 211. The digital camera 100 executes image-capturing processing according to the instruction. In addition, image data acquired through the image-capturing processing executed by the digital camera 100 can be transmitted to the mobile phone 200. In this case, the control unit 201 temporarily displays the received image data on the display unit 206 to provide an opportunity for the user to check the captured image.

In step S511, the control unit 201 determines whether an end instruction is received. For example, when a touch operation is performed on the return button 453 in FIG. 4B, the control unit 201 determines that the end instruction is received.

If the control unit 201 determines that the end instruction is received (YES in step S511), the processing returns to step S501, and the top menu is displayed. If the control unit 201 determines that the end instruction is not received (NO in step S511), the processing returns to step S507, so that the control unit 201 continues the wireless LAN remote image-capturing function while updating the display of the live view image.

Next, processing that is to be executed when the control unit 201 determines that the image-capturing mode of the digital camera 100 is the moving image-capturing mode in step S505 (NO in step S505) will be described. In this case, the processing proceeds to step S512.

In step S512, the control unit 201 displays a remote moving image-capturing screen including the recording start button 412 having a predetermined size on the display unit 206. At that time, a screen illustrated in FIG. 4C is displayed.

Similar to steps S507 and S508, in steps S513 and S514, the live view image is received and updated.

In step S515, the control unit 201 determines whether a recording start instruction is received. For example, when a touch operation is performed on the recording start button 412 in FIG. 4C, the control unit 201 determines that the recording start instruction is received. If the control unit 201 determines that recording start instruction is received (YES in step S515), the processing proceeds to step S516.

In step S516, the control unit 201 transmits the recording start instruction to the digital camera 100 via the communication unit 211. The digital camera 100 executes recording processing based on the instruction.

Next, in step S517, the control unit 201 determines whether a recording stop instruction is received. For example, when a touch operation is performed on a recording stop button switched from the recording start button 412 in FIG. 4C, the control unit 201 determines that the recording stop instruction is received. If the control unit 201 determines that recording stop instruction is received (YES in step S517), the processing proceeds to step S518.

In step S518, the control unit 201 transmits a recording stop instruction to the digital camera 100 via the communication unit 211. The digital camera 100 ends the recording processing based on the instruction.

Next, in step S519, the control unit 201 determines whether an end instruction is received. For example, when a touch operation is performed on the return button 453 in FIG. 4C, the control unit 201 determines that the end instruction is received.

If the control unit 201 determines that the end instruction is received (YES in step S519), the processing returns to step S501 so that the top menu is displayed. If the control unit 201 determines that the end instruction is not received (NO in step S519), the processing returns to step S513 so that the control unit 201 continues the wireless LAN remote moving image-capturing function while updating the display of the live view image.

The processing that is to be executed when the control unit 201 determines that an instruction for executing the wireless LAN remote image-capturing function is received in step S502 has been described above.

Next, processing that is to be executed when the control unit 201 determines that an instruction for executing the Bluetooth Low Energy remote image-capturing function is received in step S503 (YES in step S503) will be described. In this case, the processing proceeds to step S520. At this time, if the mobile phone 200 is connected to the wireless LAN instead of the Bluetooth Low Energy, the connection can be automatically switched to the Bluetooth Low Energy connection. If the mobile phone 200 is not connected to the wireless LAN or the Bluetooth Low Energy, the control unit 201 can prompt the user to connect the mobile phone 200 thereto.

In steps S520 and S521, processing similar to the processing in steps S504 and S505 is executed via the Bluetooth Low Energy connection.

First, processing that is to be executed when the control unit 201 determines that the image-capturing mode of the digital camera 100 is the still image-capturing mode in step S521 (YES in step S521) will be described. In this case, the processing proceeds to step S522.

In step S522, the control unit 201 displays a remote image-capturing screen including the shutter button 451 having a size larger than a predetermined size on the display unit 206. At that time, a screen illustrated in FIG. 4D is displayed. In the screen illustrated in FIG. 4D, the shutter button 451 is displayed in a larger size instead of the live view image. With this screen, the user can correctly perform the touch operation and input a shutter instruction without looking at the screen.

In steps S523 to S525, processing similar to the processing in steps S509 to S511 is executed.

Next, processing that is to be executed when the control unit 201 determines that the image-capturing mode of the digital camera 100 is the moving image-capturing mode in step S521 (NO in step S521) will be described. In this case, the processing proceeds to step S526.

In step S526, the control unit 201 displays a remote moving image-capturing screen including the recording start button 452 having a size larger than a predetermined size on the display unit 206. At that time, a screen illustrated in FIG. 4E is displayed. In the screen in FIG. 4E, the recording start button 452 is displayed in a larger size instead of the live view image. With this screen, the user can correctly perform the touch operation and input a recording start instruction without looking at the screen.

In steps S527 to S531, processing similar to the processing in steps S515 to S519 is executed.

The processing of the mobile phone 200 according to the present exemplary embodiment has been described above. In the mobile phone 200 according to the present exemplary embodiment, in the case where the digital camera 100 is remotely controlled via the wireless LAN, the shutter button 451 or the recording start button 452 having a larger size is displayed in a case where the digital camera 100 is remotely controlled via the Bluetooth Low Energy. With this operation, even if the user performs the operation without looking at the screen, a possibility of executing an erroneous operation can be reduced.

Other Exemplary Embodiments

In the above-described exemplary embodiment, the digital camera 100 notifies the mobile phone 200 whether the image-capturing mode is the still image-capturing mode or the moving image-capturing mode so that the mobile phone 200 displays the GUI corresponding to the mode of the digital camera 100. However, information to be notified of is not limited to the information about a mode. For example, a specification in which the still image-capturing mode and the moving image-capturing mode cannot be clearly distinguished from each other can be considered. In such a case, the mobile phone 200 can change the display based on the information indicating whether a moving image is presently being recorded. For example, the mobile phone 200 displays a screen in FIG. 4C or 4E when the moving image is being recorded and displays a screen in FIG. 4B or 4D when the moving image is not recorded.

For the sake of simplicity, in the above-described exemplary embodiment, while description of the processing for switching the image-capturing mode through the mobile phone 200 has been omitted, it is more convenient for the user if the image-capturing mode can be switched by the mobile phone 200 when the user just operates the mobile phone 200. Therefore, a step in which the control unit 201 determines whether a mode switch instruction is received can be added to a loop of steps S523 to S525 or steps S527 to S531 in FIG. 5B. When the control unit 201 receives the mode switch instruction, the control unit 201 requests the digital camera 100 to switch the mode to the still image-capturing mode or the moving image-capturing mode according to the instruction via the Bluetooth Low Energy. Then, the processing can proceed to step S522 or S526. A step for determining whether a mode switch instruction is received can be added to a loop of steps S507 to S511 or steps S513 to S519 in FIG. 5A. When the control unit 201 receives the mode switch instruction, the control unit 201 requests the digital camera 100 to switch the mode to the still image-capturing mode or the moving image-capturing mode via the wireless LAN. Then the processing can proceed to step S506 or S512.

As illustrated in FIG. 4D or 4E, the shutter button 451 or the recording start button 452 is displayed in a larger size and the touch reaction region is increased. With respect to the configuration, based on the assumption that the user performs the operation without looking at the screen, a region larger than a display region of the button can be set as the touch reaction region. In other words, image-capturing processing or recording processing is executed even if the user touches a blank space in the vicinity of the shutter button 451 or the recording start button 452. With this configuration, operability can be further improved when the user performs the operation without looking at the screen. With respect to the screen in FIG. 4B or 4C, it is preferable that the touch reaction region is set according to a display of the shutter button 411 or the recording start button 412. This is because the user is likely to perform the operation while looking at the shutter button 411 or the recording start button 412 together with the live view image. Therefore, the user may have a sense of discomfort unless the display of the button and the touch reaction region coincide with each other to a certain extent.

As illustrated in FIG. 4D or 4E, the shutter button 451 or the recording start button 452 reacts on Touch-Up or Touch-Down. However, because Touch-Down can be executed through the operation one step less than the operation executed for Touch-Up, the operation is much simpler in Touch-Down than in Touch-Up. Therefore, the shutter button 451 or the recording start button 452 can react on Touch-Down instead of Touch-Up. In this case, the mode switch button 454 can react on Touch-Up instead of Move. In other words, the mode switch button 454 reacts on the operation different from the operation performed on the shutter button 451 or the recording start button 452, having operation steps greater than that of the operation performed on the shutter button 451 or the recording start button 452. With this configuration, the erroneous operation of the shutter button 451 or the recording start button 452 can be prevented while the mode switch button 454 can be easily operated. In the screen illustrated in FIG. 4B or 4C, because the user is likely to perform the operation while looking at the button, the mode switch button 454 can react on the same operation as the operation performed on the shutter button 411 or the recording start button 412.

In the above-described exemplary embodiment, for the sake of simplicity, description of the operation performed on the digital camera 100 when remote image-capturing is being executed is omitted. In this regard, generally, the operation performed on the main body of the digital camera 100 is disabled when remote image-capturing is being executed. This is because it is not possible to determine which operation the user intends to prioritize when a simultaneous operation for changing a predetermined imaging parameter is performed on the mobile phone 200 and the digital camera 100. Accordingly, in many cases, a remote operation and a non-remote operation of the digital camera 100 are exclusively performed. The user cannot change the imaging parameter from the mobile phone 200 through a screen illustrated in FIG. 4D or 4E in which the GUI is provided based on the assumption that the user does not look at the screen. Therefore, when the digital camera 100 is remotely controlled via the Bluetooth Low Energy, the operation of the main body of the digital camera 100 is enabled. Because of the above-described reason, in a case where the digital camera 100 is remotely controlled via Wi-Fi, the operation performed on the main body of the digital camera 100 is disabled when remote image-capturing is being executed. With this configuration, the usability can be further improved. In addition, when the operation is exclusively performed, not all of the operations performed on the main body of the digital camera 100 have to be disabled, but just the operation performed on the main body that could be performed at the same time can be disabled. In other words, just the operation performed on the main body relating to imaging parameters or processing, which the user can remotely change or provide instructions from the mobile phone 200, can be disabled.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-168608, filed Aug. 30, 2016, which is hereby incorporated by reference herein in its entirety.

What is claimed is:

1. A communication apparatus comprising:
a first wireless communication unit;
a second wireless communication unit with a communication speed slower than a communication speed of the first wireless communication unit;
a control unit configured to remotely control an imaging apparatus in a mode selected from among a plurality of modes including a first mode for remotely controlling the imaging apparatus via the first wireless communication unit and a second mode for remotely controlling the imaging apparatus via the second wireless communication unit;
a display unit; and
a detection unit configured to detect a touch operation performed on the display unit,
wherein the control unit controls the display unit to display an item for inputting an instruction to cause the imaging apparatus to capture an image,
wherein the control unit controls the communication apparatus to transmit an image-capturing request to the imaging apparatus in a case where a touch operation on a predetermined region corresponding to the item for inputting an instruction to cause the imaging apparatus to capture an image is detected by the detection unit,
wherein, in the first mode, the control unit controls the display unit to display the item for inputting an instruction to cause the imaging apparatus to capture an image in a first size, and
wherein, in the second mode, the control unit controls the display unit to display the item for inputting an instruction to cause the imaging apparatus to capture an image in a second size that is larger than the first size.

2. The communication apparatus according to claim 1, wherein, in the first mode, the control unit controls the display unit to display a live view image sequentially captured and acquired by the imaging apparatus, and
wherein, in the second mode, the control unit controls the display unit not to display the live view image sequentially captured and acquired by the imaging apparatus.

3. The communication apparatus according to claim 1, wherein, in the first mode, the control unit controls the communication apparatus to receive a live view image sequentially captured and acquired by the imaging apparatus via the first wireless communication unit, and
wherein, in the second mode, the control unit controls the communication apparatus not to receive the live view image sequentially captured and acquired by the imaging apparatus via the second wireless communication unit.

4. The communication apparatus according to claim 1, wherein, in the second mode, the control unit controls the display unit to display the item for inputting an instruction to cause the imaging apparatus to capture an image in a size larger than a size of another item displayed on a same screen.

5. The communication apparatus according to claim 1, wherein an instruction to cause the imaging apparatus to capture a still image and an instruction to cause the imaging apparatus to capture a moving image can be input in the first mode and the second mode.

6. The communication apparatus according to claim 1, wherein electric power necessary to operate the second wireless communication unit is less than power necessary to operate the first wireless communication unit.

7. The communication apparatus according to claim 1, wherein the touch operation is an operation of removing a touch after performing the touch.

8. The communication apparatus according to claim 1, wherein a number of imaging parameter types settable in the first mode is greater than a number of imaging parameter types settable in the second mode.

9. A communication apparatus configured to wirelessly communicate with an imaging apparatus, the communication apparatus comprising:
a communication unit;
a display unit;
a detection unit configured to detect a touch operation on the display unit; and
a control unit configured to control the display unit to display an item for inputting an instruction to cause the imaging apparatus to capture an image,
wherein the control unit receives, via the communication unit, a live view image sequentially captured and acquired by the imaging apparatus,
wherein the control unit remotely controls the imaging apparatus in a selected mode from among a plurality of modes including a first mode for sequentially displaying, on the display unit, the live view image received via the communication unit and a second mode for not displaying the live view image sequentially captured and acquired by the imaging apparatus,
wherein the control unit transmits an image-capturing request to the imaging apparatus in a case where a touch operation on a predetermined region corresponding to the item for inputting an instruction to cause the imaging apparatus to capture an image is detected by the detection unit,
wherein, in the first mode, the control unit controls the display unit to display the item for inputting an instruction to cause the imaging apparatus to capture an image in a first size, and
wherein, in the second mode, the control unit controls the display unit to display the item for inputting an instruction to cause the imaging apparatus to capture an image in a second size that is larger than the first size.

10. The communication apparatus according to claim 9, wherein, in the second mode, the control unit controls the display unit to display the item for inputting an instruction to cause the imaging apparatus to capture an image in a size larger than a size of another item displayed on a same screen.

11. The communication apparatus according to claim 9, wherein an instruction to cause the imaging apparatus to capture a still image and an instruction to cause the imaging apparatus to capture a moving image can be input in the first mode and the second mode.

12. A control method of a communication apparatus including a first wireless communication unit, a second wireless communication unit with a communication speed slower than a communication speed of the first wireless communication unit, and a display unit, the control method comprising:
  remotely controlling an imaging apparatus in a mode selected from among a plurality of modes including a first mode for remotely controlling the imaging apparatus via the first wireless communication unit and a second mode for remotely controlling the imaging apparatus via the second wireless communication unit;
  controlling the display unit to display an item for inputting an instruction to cause the imaging apparatus to capture an image;
  detecting a touch operation on the display unit; and
  transmitting an image-capturing request to the imaging apparatus in a case where a touch operation on a predetermined region corresponding to the item for inputting an instruction to cause the imaging apparatus to capture an image is detected,
  wherein, in the first mode, the display unit is controlled to display the item for inputting an instruction to cause the imaging apparatus to capture an image in a first size, and
  wherein, in the second mode, the display unit is controlled to display the item for inputting an instruction to cause the imaging apparatus to capture an image in a second size that is larger than the first size.

13. A control method of a communication apparatus including a display unit and configured to wirelessly communicate with an imaging apparatus, the control method comprising:
  controlling the display unit to display an item for inputting an instruction to cause the imaging apparatus to capture an image;
  receiving a live view image sequentially captured and acquired by the imaging apparatus;
  remotely controlling the imaging apparatus in a selected mode from among a plurality of modes including a first mode for sequentially displaying the received live view image on the display unit and a second mode for not displaying the live view image sequentially captured and acquired by the imaging apparatus on the display unit;
  detecting a touch operation on the display unit; and
  transmitting an image-capturing request to the imaging apparatus in a case where a touch operation on a predetermined region corresponding to the item for inputting an instruction to cause the imaging apparatus to capture an image is detected,
  wherein, in the first mode, the display unit is controlled to display the item for inputting an instruction to cause the imaging apparatus to capture an image in a first size, and
  wherein, in the second mode, the display unit is controlled to display the item for inputting an instruction to cause the imaging apparatus to capture an image in a second size that is larger than the first size.

14. A non-transitory computer-readable storage medium that stores a program to cause a communication apparatus including a first wireless communication unit, a second wireless communication unit with a communication speed slower than a communication speed of the first wireless communication unit, and a display unit, to execute a method, the method comprising:
  remotely controlling an imaging apparatus in a mode selected from among a plurality of modes including a first mode for remotely controlling the imaging apparatus via the first wireless communication unit and a second mode for remotely controlling the imaging apparatus via the second wireless communication unit;
  controlling the display unit to display an item for inputting an instruction to cause the imaging apparatus to capture an image;
  detecting a touch operation on the display unit; and
  transmitting an image-capturing request to the imaging apparatus in a case where a touch operation on a predetermined region corresponding to the item for inputting an instruction to cause the imaging apparatus to capture an image is detected,
  wherein, in the first mode, the display unit is controlled to display the item for inputting an instruction to cause the imaging apparatus to capture an image in a first size, and
  wherein, in the second mode, the display unit is controlled to display the item for inputting an instruction to cause the imaging apparatus to capture an image in a second size that is larger than the first size.

15. A non-transitory computer-readable storage medium that stores a program to cause a computer to execute a method, the method comprising:
  controlling a display unit to display an item for inputting an instruction to cause an imaging apparatus to capture an image;
  receiving a live view image sequentially captured and acquired by the imaging apparatus;
  remotely controlling the imaging apparatus in a selected mode from among a plurality of modes including a first mode for sequentially displaying the received live view image on the display unit and a second mode for not displaying the live view image sequentially captured and acquired by the imaging apparatus on the display unit;
  detecting a touch operation on the display unit; and
  transmitting an image-capturing request to the imaging apparatus in a case where a touch operation on a predetermined region corresponding to the item for inputting an instruction to cause the imaging apparatus to capture an image is detected,
  wherein, in the first mode, the display unit is controlled to display the item for inputting an instruction to cause the imaging apparatus to capture an image in a first size, and
  wherein, in the second mode, the display unit is controlled to display the item for inputting an instruction to cause the imaging apparatus to capture an image in a second size that is larger than the first size.

16. A communication apparatus comprising:
  a first wireless interface;
  a second wireless interface with a communication speed slower than a communication speed of the first wireless interface;
  a display; and
  at least one controller that is configured to
    remotely control an imaging apparatus in a mode selected from among a plurality of modes including a first mode for remotely controlling the imaging apparatus via the first wireless interface and a second mode for remotely controlling the imaging apparatus via the second wireless interface; and
    detect a touch operation performed on the display,
  wherein the controller controls the display to display an item for inputting an instruction to cause the imaging apparatus to capture an image, wherein the controller controls the communication apparatus to transmit an image-capturing request to the imaging apparatus in a case where a touch operation on a predetermined region corresponding to the item for inputting an instruction to cause the imaging apparatus to capture an image is detected, wherein, in the first mode, the controller controls the display to display the item for inputting an instruction to cause the imaging apparatus to capture an image in a first size, and wherein, in the second mode, the controller controls the display to display the item for inputting an instruction to cause the imaging apparatus to capture an image in a second size that is larger than the first size.

17. The communication apparatus according to claim 16, wherein, in the first mode, the controller controls the display to display a live view image sequentially captured and acquired by the imaging apparatus, and wherein, in the second mode, the controller controls the display not to display the live view image sequentially captured and acquired by the imaging apparatus.

18. The communication apparatus according to claim 16, wherein, in the first mode, the controller controls the communication apparatus to receive a live view image sequentially captured and acquired by the imaging apparatus via the first wireless interface, and wherein, in the second mode, the controller controls the communication apparatus not to receive the live view image sequentially captured and acquired by the imaging apparatus via the second wireless interface.

19. The communication apparatus according to claim 16, wherein, in the second mode, the controller controls the display to display the item for inputting an instruction to cause the imaging apparatus to capture an image in a size larger than a size of another item displayed on a same screen.

20. The communication apparatus according to claim 16, wherein an instruction to cause the imaging apparatus to capture a still image and an instruction to cause the imaging apparatus to capture a moving image can be input in the first mode and the second mode.

21. The communication apparatus according to claim 16, wherein electric power necessary to operate the second wireless interface is less than power necessary to operate the first wireless interface.

22. The communication apparatus according to claim 16, wherein the touch operation is an operation of removing a touch after performing the touch.

23. The communication apparatus according to claim 16, wherein a number of imaging parameter types settable in the first mode is greater than a number of imaging parameter types settable in the second mode.

24. The communication apparatus according to claim 16, wherein
in the second mode, the controller controls the display so as to display an icon indicating a camera as the item.

25. A communication apparatus configured to wirelessly communicate with an imaging apparatus, the communication apparatus comprising:
a communication interface;
a display; and
at least one controller that is configured to
detect a touch operation on the display; and
control the display to display an item for inputting an instruction to cause the imaging apparatus to capture an image,
wherein the controller receives, via the communication interface, a live view image sequentially captured and acquired by the imaging apparatus,
wherein the controller remotely controls the imaging apparatus in a selected mode from among a plurality of modes including a first mode for sequentially displaying, on the display, the live view image received via the communication interface and a second mode for not displaying the live view image sequentially captured and acquired by the imaging apparatus,
wherein the controller transmits an image-capturing request to the imaging apparatus in a case where a touch operation on a predetermined region corresponding to the item for inputting an instruction to cause the imaging apparatus to capture an image is detected,
wherein, in the first mode, the controller controls the display to display the item for inputting an instruction to cause the imaging apparatus to capture an image in a first size, and
wherein, in the second mode, the controller controls the display to display the item for inputting an instruction to cause the imaging apparatus to capture an image in a second size that is larger than the first size.

26. The communication apparatus according to claim 25, wherein, in the second mode, the controller controls the display to display the item for inputting an instruction to cause the imaging apparatus to capture an image in a size larger than a size of another item displayed on a same screen.

27. The communication apparatus according to claim 25, wherein an instruction to cause the imaging apparatus to capture a still image and an instruction to cause the imaging apparatus to capture a moving image can be input in the first mode and the second mode.

28. The communication apparatus according to claim 25, wherein
in the second mode, the controller controls the display so as to display an icon indicating a camera as the item.

* * * * *